(12) United States Patent
Qin et al.

(10) Patent No.: US 9,164,343 B2
(45) Date of Patent: Oct. 20, 2015

(54) METHOD FOR SAVING BY-PASS CAPACITOR BY USING CIRCUIT BOARD

(71) Applicant: Shenzhen China Star Optoelectronics Technology Co., Ltd., Shenzhen, Guangdong (CN)

(72) Inventors: Jiehui Qin, Shenzhen (CN); Xiaoping Tan, Shenzhen (CN); Poshen Lin, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 320 days.

(21) Appl. No.: 13/807,071

(22) PCT Filed: Dec. 4, 2012

(86) PCT No.: PCT/CN2012/085780
§ 371 (c)(1),
(2) Date: Dec. 27, 2012

(87) PCT Pub. No.: WO2014/082317
PCT Pub. Date: Jun. 5, 2014

(65) Prior Publication Data
US 2014/0211116 A1     Jul. 31, 2014

(30) Foreign Application Priority Data
Nov. 27, 2012  (CN) .......................... 2012 1 0491013

(51) Int. Cl.
*G02F 1/1368* (2006.01)
*G02F 1/1345* (2006.01)
*G09G 3/36* (2006.01)

(52) U.S. Cl.
CPC .......... *G02F 1/1368* (2013.01); *G02F 1/13452* (2013.01); *G09G 3/3648* (2013.01); *G09G 2300/0426* (2013.01); *G09G 2330/028* (2013.01)

(58) Field of Classification Search
CPC ...... G02F 1/13452; G02F 1/1368; G09G 3/36
USPC .................................................. 349/149–152
See application file for complete search history.

(56) References Cited

U.S. PATENT DOCUMENTS 6,157,357 A * 12/2000 Kim ................................ 345/87
8,018,548 B2 * 9/2011 Igarashi et al. ................. 349/58
(Continued)

FOREIGN PATENT DOCUMENTS

| CN | 1837911 A | 9/2006 |
|---|---|---|
| CN | 101093303 A | 12/2007 |
| CN | 101093648 A | 12/2007 |

(Continued)

*Primary Examiner* — Bumsuk Won
*Assistant Examiner* — Kendrick Hsu
(74) *Attorney, Agent, or Firm* — Andrew C. Cheng

(57) ABSTRACT

The present invention provides a method for saving by-pass capacitor by using circuit board, which includes (1) providing a liquid crystal panel including two glass substrates and liquid crystal material containing liquid crystal molecules, the glass substrates forming a liquid crystal panel driving circuit, which includes a gate driver, a source driver, gate lines, and data lines; (2) providing a power supply module and a power connection circuit board including a base material on which a power route and a grounding route are provided to respectively form exposed copper zones at a location where a by-pass capacitor is desired to form so as to form an equivalent by-pass capacitor; (3) connecting the gate driver and the source driver via the power connection circuit board to the power supply module; and (4) activating the power supply module to control rotation of the liquid crystal molecules of each of the pixel units.

7 Claims, 5 Drawing Sheets

(56) References Cited

U.S. PATENT DOCUMENTS

2002/0126250 A1* 9/2002 Ozawa ............................ 349/187
2007/0291042 A1* 12/2007 Kwak et al. .................... 345/535

FOREIGN PATENT DOCUMENTS

| CN | 101409500 A | 4/2009 |
|---|---|---|
| JP | 2008281598 A | 11/2008 |

* cited by examiner

1 — providing a liquid crystal panel, wherein the liquid crystal panel comprises two glass substrates and a liquid crystal material arranged between the two glass substrates, the glass substrates forming a liquid crystal panel driving circuit, the liquid crystal panel driving circuit comprising a gate driver, a source driver, a plurality of gate lines, and a plurality of data lines, the plurality of gate lines and the data lines defining a plurality of pixel units, the liquid crystal material comprising liquid crystal molecules 2 — providing a power supply module and a power connection circuit board, wherein the power connection circuit board comprises two printing plates that are arranged parallel to each other and a base material arranged between the two printing plates, one of the printing plates being provided with a power route, the other one of the printing plates being provided with a grounding route, the power route and the grounding route each comprising an exposed copper zone at a location where a by-pass capacitor is desired to form, the two exposed copper zones and the base material between the two exposed copper zone collectively forming an equivalent by-pass capacitor to achieve an effect of by-pass capacitance 3 — connecting the gate driver and the source driver via the power connection circuit board to the power supply module 4 — activating the power supply module to supply electrical power to the gate driver and the source driver so as to control, via the data lines and the gate lines, the rotation of liquid crystal molecules contained in each of the pixel units

Fig. 3

METHOD FOR SAVING BY-PASS CAPACITOR BY USING CIRCUIT BOARD

BACKGROUND OF THE INVENTION

1. Field of the Invention

The present invention relates to the field of liquid crystal display, and in particular to a method for saving by-pass capacitor by using circuit board.

2. The Related Arts

A liquid crystal display is a displaying device, which comprise a layer of liquid crystal interposed between two opposite substrates. The displaying device effects light switching by applying electrical excitation and optical anisotropy of the liquid crystal. With the anisotropy of refractivity of liquid crystal molecule, the liquid crystal display applies electrical voltage to the liquid crystal molecule to reorienting the axis of anisotropy of refractivity to control the luminance of light transmitting through the liquid crystal molecule.

FIG. 1 is a schematic view showing the structure of an essential driving circuit for liquid crystal displaying. In the drawing, operation voltages of a source driver 100 and a gate driver 200 are obtained through a DC-DC conversion circuit 300. Since the source driver 100 and the gate driver 200 supply various driving voltages to various pixel units 400 in order to provide the liquid crystal molecules of these pixel units 400 with different rotation angles thereby showing different display grey levels, the voltages on the loads of the source driver 100 and the gate driver 200 are variable with the change of the images. To reduce the influence on the pixel units 400 caused by variation of voltages resulting from loading variation, by-pass capacitors are often connected in parallel to power input terminals of each source driving chip 102 and each gate driving chip 202 in order to stabilize voltage.

As shown in FIGS. 2A and 2B, the operation voltage VDD (3.3V) of the source drivers is obtained from a DC-DC conversion circuit. Each of the source driving chips 102 of the source driver must be connected in parallel with at least one by-pass capacitor C. Similarly, the gate driving chip 202 of the gate driver is also connected in parallel with a plurality of by-pass capacitors C.

For a commonly adopted 1024*768 resolution of a liquid crystal panel, if each source driving chip and gate driving chip is connected in parallel with one single capacitor, then the total number of by-pass capacitors that are connected in parallel to the panel is 786,432. With the size of the liquid crystal panel getting expanded, the corresponding numbers of the source driving chips and gate driving chips used are increased, so that the necessary number of the by-pass capacitors is also increased. This results in an increase of cost and increased complication of circuit.

Further, it is known that a capacitor is made up of two electrode and a dielectric substance interposed therebetween. The dielectric substance is a dielectric medium, which when placed in an electric field between two parallel plate electrodes carrying electrical charges of equal amount but opposite signs, will get polarized so as to form polarization charges on the surfaces of the dielectric medium, causing an increase of the electrical charges bonded on the electrode plates so as to maintain the potential difference between the electrode plates substantially constant, resulting in capacitance effect.

SUMMARY OF THE INVENTION

An object of the present invention is to provide a method for saving by-pass capacitor by using circuit board, wherein parallel electrodes of exposed copper zones on opposite sides of base material of circuit board are used to induce capacitance effect for replacing by-pass capacitor. The method allows a reduction of the number of capacitors that are practically used in a liquid crystal display driving circuit so as to lower down the manufacture cost.

To achieve the object, the present invention provides a method for saving by-pass capacitor by using circuit board, which comprises the following steps:

(1) providing a liquid crystal panel, wherein the liquid crystal panel comprises two glass substrates and a liquid crystal material arranged between the two glass substrates, the glass substrates forming a liquid crystal panel driving circuit, the liquid crystal panel driving circuit comprising a gate driver, a source driver, a plurality of gate lines, and a plurality of data lines, the plurality of gate lines and the data lines defining a plurality of pixel units, the liquid crystal material comprising liquid crystal molecules;

(2) providing a power supply module and a power connection circuit board, wherein the power connection circuit board comprises two printing plates that are arranged parallel to each other and a base material arranged between the two printing plates, one of the printing plates being provided with a power route, the other one of the printing plates being provided with a grounding route, the power route and the grounding route each comprising an exposed copper zone at a location where a by-pass capacitor is desired to form, the two exposed copper zones and the base material between the two exposed copper zone collectively forming an equivalent by-pass capacitor to achieve an effect of by-pass capacitance;

(3) connecting the gate driver and the source driver via the power connection circuit board to the power supply module; and (4) activating the power supply module to supply electrical power to the gate driver and the source driver so as to control, via the data lines and the gate lines, the rotation of liquid crystal molecules contained in each of the pixel units.

The base material comprises an insulation material.

The source driver comprises a plurality of source driving chips. The plurality of data lines are arranged to correspond to the plurality of source driving chips so that each of the data lines is individually controllable.

The gate driver comprises a plurality of gate driving chips. The plurality of gate lines are arranged to correspond to the plurality of gate driving chips so that each of the gate lines is individually controllable.

The pixel units each comprises a thin-film transistor, a common electrode, a pixel electrode electrically connected to the thin-film transistor, and a storage capacitor. The thin-film transistors are respectively and electrically connected via the gate lines and the data lines to the gate driver and the source driver. The common electrode and the pixel electrode collectively form a liquid crystal capacitor. The storage capacitor is connected in parallel with the liquid crystal capacitor.

The thin-film transistors each comprise a gate terminal, a source terminal, and a drain terminal. The gate terminal is electrically connected via the respective gate line to the gate driver. The source terminal is electrically connected via the respective data line to the source driver. The drain terminal is electrically connected to the pixel electrode.

The gate driving chips and the source driving chips are each provided with a power input terminal. The two exposed copper zones of step (2) are provided at the power input terminal of each of the gate driving chips and the source driving chips.

The exposed copper zones of each of the equivalent by-pass capacitors have an effective area that is determined according to capacitance of the desired capacitor at the location.

Each of the equivalent by-pass capacitors has capacitance determined by the following equation:

$$c = \frac{\varepsilon * S}{D}$$

in which $\varepsilon$ indicates dielectric constant of the base material, D is thickness of the board of the base material, and S indicates effective area of the exposed copper zones.

The power supply module comprises a DC-DC conversion power supply.

The present invention also provides a method for saving by-pass capacitor by using circuit board, which comprises the following steps:

(1) providing a liquid crystal panel, wherein the liquid crystal panel comprises two glass substrates and a liquid crystal material arranged between the two glass substrates, the glass substrates forming a liquid crystal panel driving circuit, the liquid crystal panel driving circuit comprising a gate driver, a source driver, a plurality of gate lines, and a plurality of data lines, the plurality of gate lines and the data lines defining a plurality of pixel units, the liquid crystal material comprising liquid crystal molecules;

(2) providing a power supply module and a power connection circuit board, wherein the power connection circuit board comprises two printing plates that are arranged parallel to each other and a base material arranged between the two printing plates, one of the printing plates being provided with a power route, the other one of the printing plates being provided with a grounding route, the power route and the grounding route each comprising an exposed copper zone at a location where a by-pass capacitor is desired to form, the two exposed copper zones and the base material between the two exposed copper zone collectively forming an equivalent by-pass capacitor to achieve an effect of by-pass capacitance;

(3) connecting the gate driver and the source driver via the power connection circuit board to the power supply module; and (4) activating the power supply module to supply electrical power to the gate driver and the source driver so as to control, via the data lines and the gate lines, the rotation of liquid crystal molecules contained in each of the pixel units;

wherein the base material comprises an insulation material;

wherein the source driver comprises a plurality of source driving chips, the plurality of data lines being arranged to correspond to the plurality of source driving chips so that each of the data lines is individually controllable;

wherein the gate driver comprises a plurality of gate driving chips, the plurality of gate lines being arranged to correspond to the plurality of gate driving chips so that each of the gate lines is individually controllable;

wherein the pixel units each comprises a thin-film transistor, a common electrode, a pixel electrode electrically connected to the thin-film transistor, and a storage capacitor, the thin-film transistor being respectively and electrically connected via the gate lines and the data lines to the gate driver and the source driver, the common electrode and the pixel electrode collectively forming a liquid crystal capacitor, the storage capacitor being connected in parallel with the liquid crystal capacitor;

wherein the thin-film transistors each comprise a gate terminal, a source terminal, and a drain terminal, the gate terminal being electrically connected via the respective gate line to the gate driver, the source terminal being electrically connected via the respective data line to the source driver, the drain terminal being electrically connected to the pixel electrode;

wherein the gate driving chips and the source driving chips are each provided with a power input terminal, the two exposed copper zones of step (2) being provided at the power input terminal of each of the gate driving chips and the source driving chips;

wherein the exposed copper zones of each of the equivalent by-pass capacitors have an effective area that is determined according to capacitance of the desired capacitor at the location;

wherein each of the equivalent by-pass capacitors has capacitance determined by the following equation:

$$c = \frac{\varepsilon * S}{D}$$

in which $\varepsilon$ indicates dielectric constant of the base material, D is thickness of the board of the base material, and S indicates effective area of the exposed copper zones; and wherein the power supply module comprises a DC-DC conversion power supply.

The efficacy of the present invention is that the present invention provides a method for saving by-pass capacitor by using circuit board, which comprises a power connection circuit board that comprises a structure of two printing plates and forms a power route and a grounding route on the two printing plates respectively in such a way that the power route and the grounding route are provided with exposed copper zones at a site where a by-pass is needed so that capacitance effect induced by the two exposed copper zones constitutes an equivalent by-pass capacitor that can replace a by-pass used in the known techniques, whereby the number of by-pass capacitors used in a driving circuit of liquid crystal display can be reduced to reduce cost and complication of the circuit.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings:

FIG. 3 is a flow chart illustrating a method for saving by-pass capacitors by using circuit board according to the present invention;

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
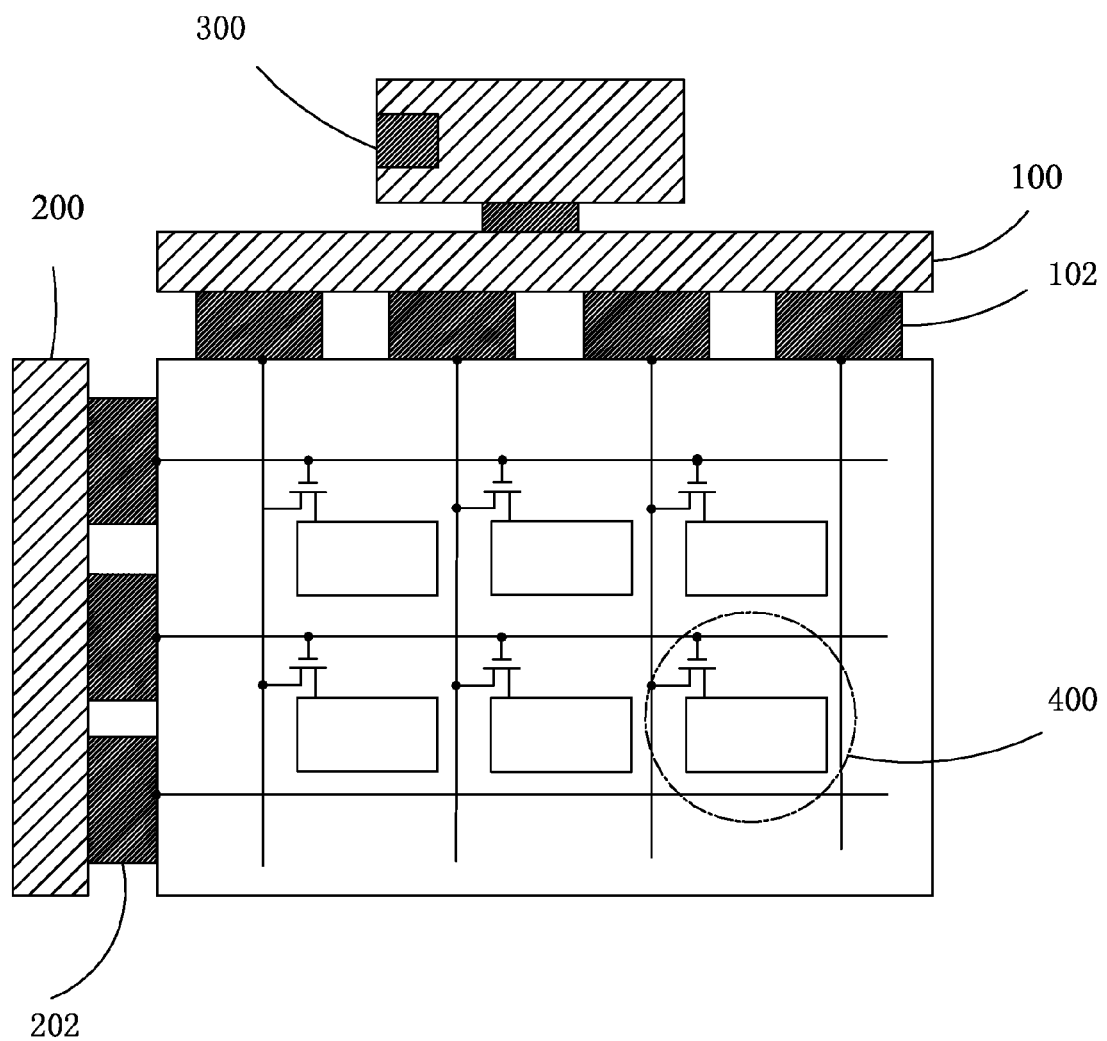
FIG. 1 is a schematic view showing a conventional driving architecture and connection of an ordinary display panel.
Figure 2A:
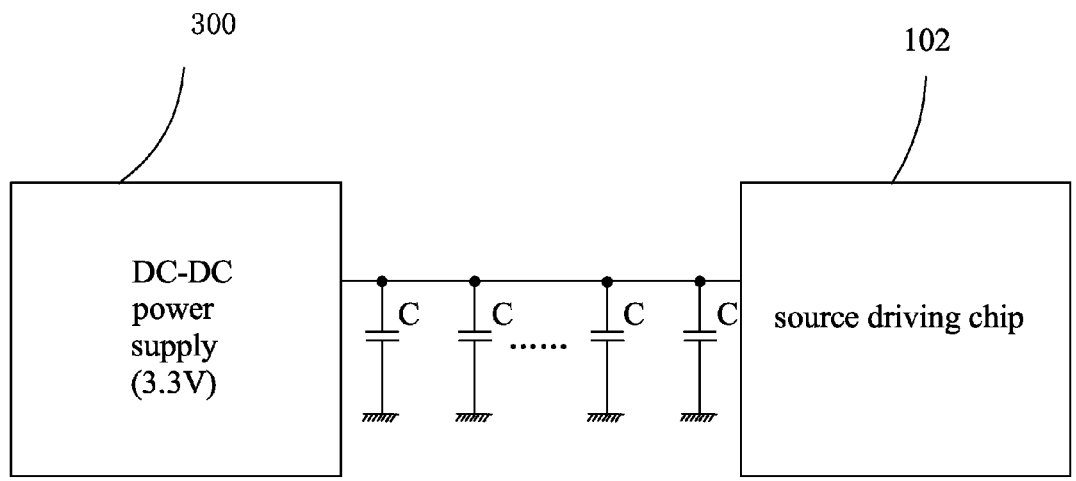
FIG. 2A is a schematic view showing a conventional connection of by-pass capacitors to source driving chip.
Figure 2B:
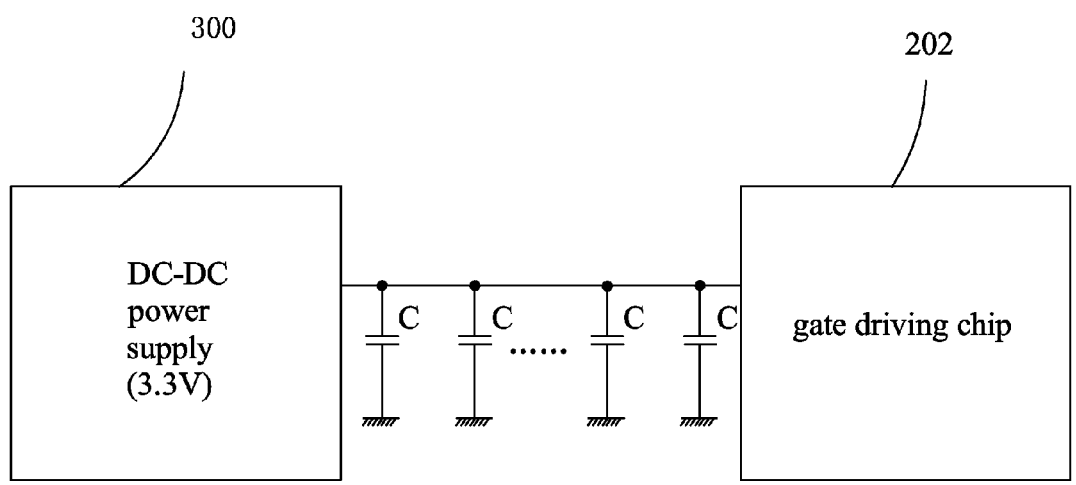
FIG. 2B is a schematic view showing a conventional connection of by-pass capacitors to gate driving chip.
Figure 4:
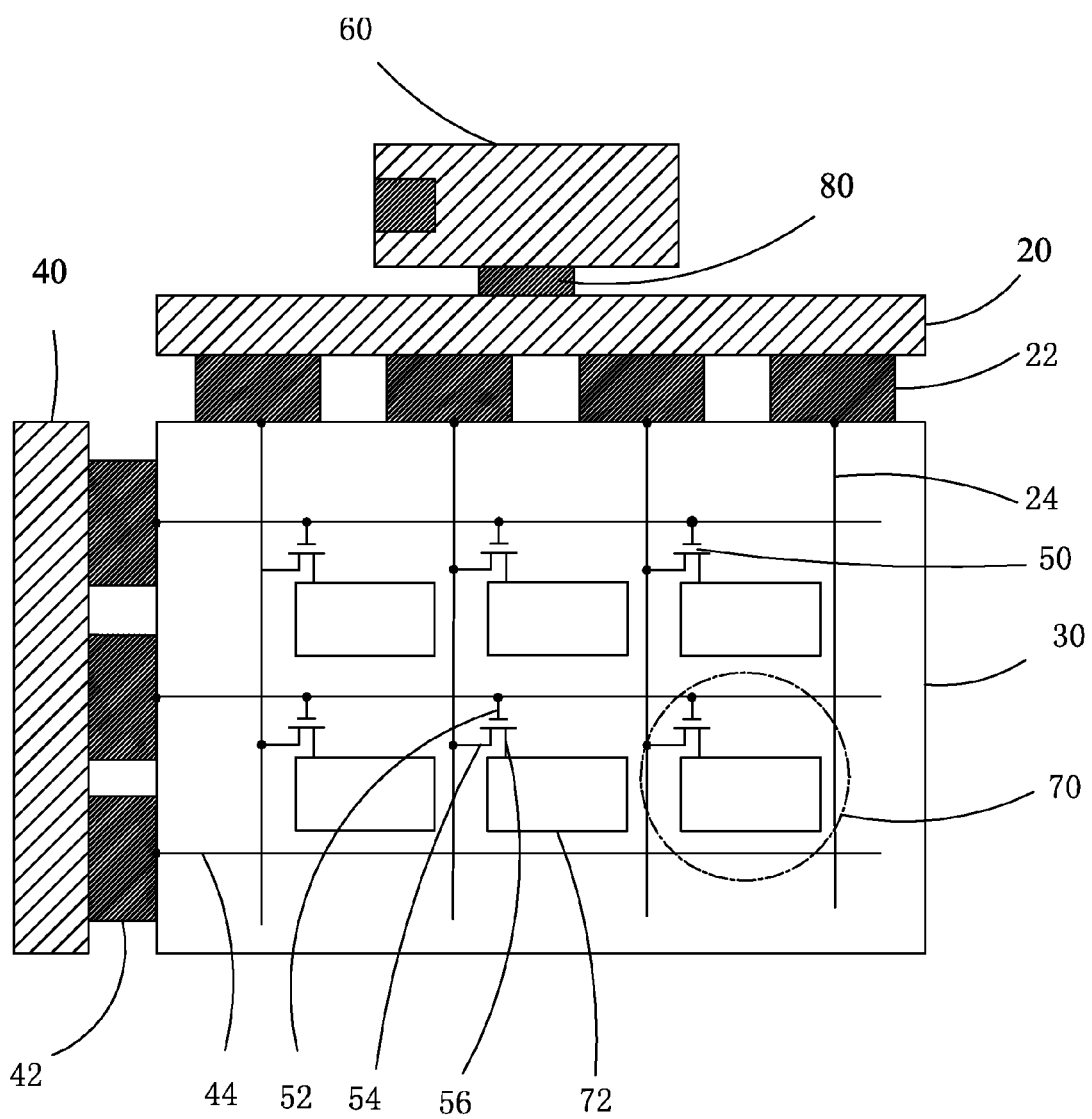
FIG. 4 is a schematic view showing display panel driving architecture and connection used in the method for saving by-pass capacitor by using circuit board according to the present invention.
Figure 5:
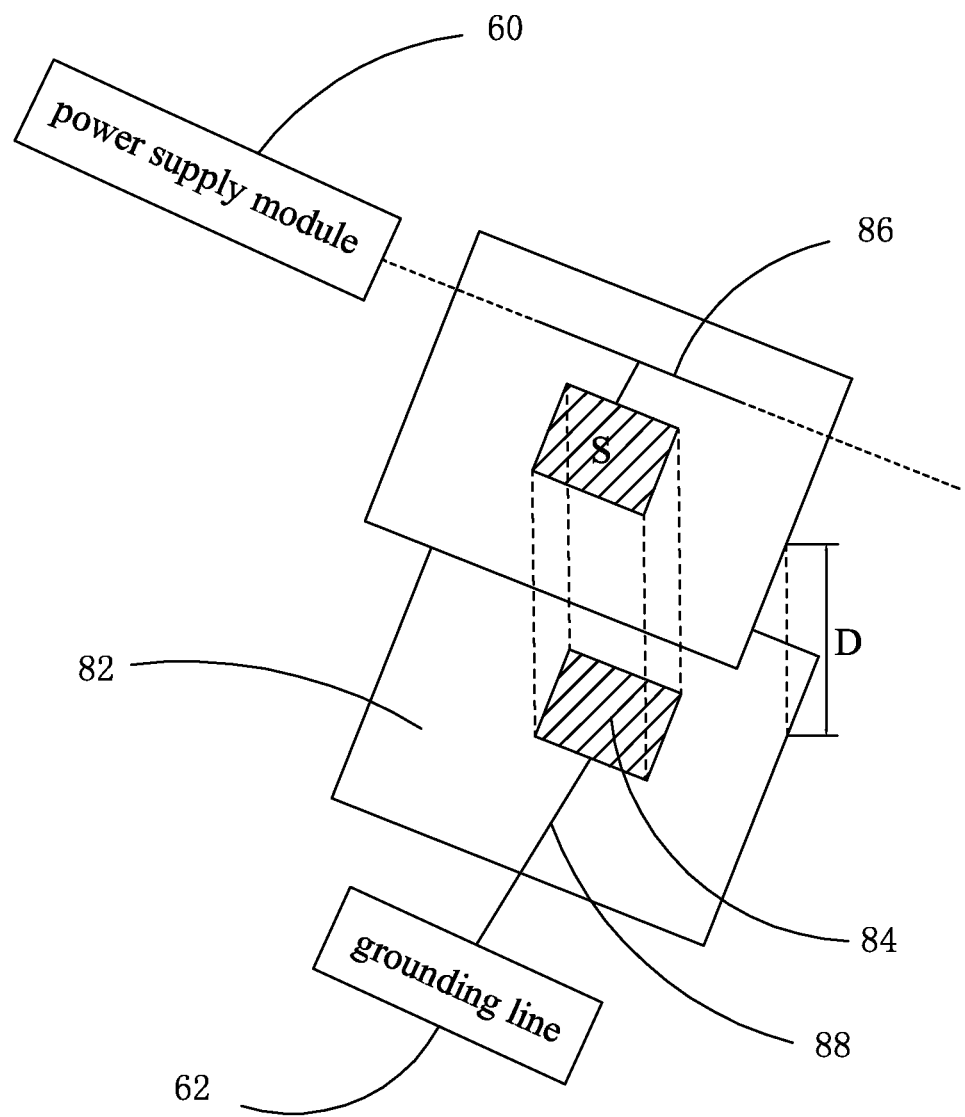
FIG. 5 is a schematic view showing the structure and connection of power circuit board used in the method for saving by-pass capacitor by using circuit board according to the present invention.

Referring to FIGS. 3-5, the present invention provides a method for saving by-pass capacitor by using circuit board, which comprises the following steps:

Step 1: providing a liquid crystal panel 30, wherein the liquid crystal panel 30 comprises two glass substrates (not shown) and a liquid crystal material (not shown) arranged between the two glass substrates, the glass substrates forming a liquid crystal panel driving circuit, the liquid crystal panel driving circuit comprising a gate driver 40, a source driver 20, a plurality of gate lines 44, and a plurality of data lines 24, the plurality of gate lines 44 and the data lines 24 defining a plurality of pixel units 70, the liquid crystal material comprising liquid crystal molecules.

The liquid crystal panel driving circuit applies a driving voltage to the liquid crystal molecules contained in the liquid crystal material, whereby the driving voltage enables liquid crystal molecules to operate as an optical switch and also makes the liquid crystal molecules rotating by different angles to show different light intensities and light steps.

The pixel units 70 each comprise a thin-film transistor 50, a common electrode, a pixel electrode 72 electrically connected to the thin-film transistor 50, and a storage capacitor. The thin-film transistor 50 is respectively and electrically connected via the gate lines 44 and the data lines 24 to the gate driver 40 and the source driver 20. The common electrode and the pixel electrode 72 collectively form a liquid crystal capacitor. The storage capacitor is connected in parallel with the liquid crystal capacitor.

The thin-film transistor 50 comprises a gate terminal 52, a source terminal 54, and a drain terminal 56. The gate terminal 52 is electrically connected via the respective gate line 44 to the gate driver 40. The source terminal 54 is electrically connected by the respective data line 24 to the source driver 20. The drain terminal 56 is electrically connected to the pixel electrode 72.

The thin-film transistor 50 is a controllable switching element, which is safe and reliable. When a voltage applied to the gate terminal 52 exceeds a threshold voltage of the thin-film transistor 50, the source terminal 54 and the drain terminal 56 of the thin-film transistor 50 are conducted with each other.

In the disclosure, the gate driver 40 comprises a plurality of gate driving chips 42. The plurality of gate lines 44 is arranged to respectively correspond to the plurality of gate driving chips 42, so that each of the gate driving chips 42 is connected to one of the gate lines 44, whereby each of the gate lines 44 can be individually controlled by the voltage applied to each of the gate driving chips 42.

Each of the thin-film transistors 50 that are connected to the gate line 44 operates according to the level of voltage on the gate line 44 to set the source terminal 54 and the drain terminal 56 of the thin-film transistor 50 in a conduction condition or cutoff condition so as to control the writing of display data into the pixel electrode 72 where the thin-film transistor 50 is in.

The source driver 20 comprises a plurality of source driving chips 22. The plurality of data lines 24 is arranged to respectively correspond to the plurality of source driving chips 22 so that each of the source driving chips 22 is connected to one of the data lines 24, whereby each of the data lines 24 can be individually controlled by the voltage applied to each of the source driving chips 22.

Each of the data lines 24 controls the thin-film transistors 50 at the connections of the data line 24 with the gate lines 44 to conduct on or cut off. In the conduction condition, the pixel electrode 72 is written in the driving voltage that causes liquid crystal molecules to rotate so as to control the rotation angle of liquid crystal molecules, thereby achieving displaying of image.

Step 2: providing a power supply module 60 and a power connection circuit board 80, wherein the power connection circuit board 80 comprises two printing plates 82 that are arranged parallel to each other and a base material (not shown) arranged between the two printing plates 82, one of the printing plates 82 being provided with a power route 86, the other one of the printing plates 82 being provided with ha grounding route 88, the power route 86 and the grounding route 88 each comprising an exposed copper zone 84 at a location where a by-pass is desired to form, the two exposed copper zones 84 and the base material between the two exposed copper zone 84 collectively forming an equivalent by-pass capacitor C to achieve an effect of by-pass capacitance.

The one exposed copper zone 84 formed on the one of the printing plates 82 that comprises the power route 86 is connected to the power supply module 60. The other one exposed copper zone 84 formed on the other one of the printing plates 82 that comprises the grounding route 88 is connected to a grounding line 62. In other words, the capacitor that is made up of the two exposed copper zones 84 and the base material between the two exposed copper zones 84 is connected in parallel between the power supply module 60 and the grounding line 62. The printing plates 82 are each a printed circuit board made of an insulation material on which a predetermined route corresponding to the power route 86 or the grounding route is printed.

The base material is an insulation material and is thus a non-conductive dielectric material. The base material of the power connection circuit board 80 features an insulation property that meets the basic requirements for a regular circuit board. Further, for the purposes of the present invention, the insulation property of the base material is an essential factor for forming the equivalent by-pass capacitor. Based on the capacitance of the equivalent by-pass capacitor to be obtained, under the assumptions that the two opposite exposed copper zones 84 have effective areas that are of the same size S, a spacing distance between the two parallel printing plates 82 is D, and the dielectric constant of the equivalent by-pass capacitor is $\in$, the capacitance of the equivalent capacitor C satisfies the following equation:

$$c = \frac{\varepsilon * S}{D} \quad (1)$$

in which since the base material is determined, the dielectric constant $\in$ is fixed and not variable (commonly used FR-4 material having a dielectric constant $\in$ that is 4.6) and for the same piece of power connection circuit board, the board thickness D is also fixed and not variable.

Equation (1) indicates that under the condition that the dielectric constant E and thickness D are both fixed, varying the size of the effective area S can control the capacitance of the equivalent by-pass capacitor C so formed so as to meet the needs of by-pass capacitor. This method can be easily implemented.

The gate driving chips 42 and the source driving chips 22 are each provided with a power input terminal. In this step, two exposed copper zones 84 are provided at the power input terminal of each of the gate driving chips 42 and the source driving chips 22 to have the equivalent by-pass capacitor C made up of the two the exposed copper zone 84 satisfy the need of by-pass capacitor in the known techniques.

The power supply module 60 is a DC-DC conversion power supply. The DC-DC conversion power supply converts a DC power into a DC driving voltage for the gate terminals 52 and the source terminals 54. Particularly, in providing driving voltage to the source driving chips 22, different DC driving voltages can be selectively provided according to the desired rotation angles of the liquid crystal molecules. Further, the DC driving voltage obtained through subjecting electrical power to the DC-DC conversion is of a rectangular periodic waveform and such a waveform shows different phases corresponding to different ones of the gate driving chips 42. Such a waveform is used control conduction of different gate lines 44 and thus controls the timing of writing for the row or column of pixel electrodes 72.

Step 3: connecting the gate driver 40 and the source driver 20 via the power connection circuit board 80 to the power supply module 60.

Step 4: activating the power supply module 60 to supply electrical power to the gate driver 40 and the source driver 20 so as to control, via the data lines 24 and the gate lines 22, the rotation of liquid crystal molecules contained in each of the pixel units 70.

In summary, the present invention provides a method for saving by-pass capacitor by using circuit board, which comprises a power connection circuit board that comprises a structure of two printing plates and forms a power route and a grounding route on the two printing plates respectively in such a way that the power route and the grounding route are provided with exposed copper zones at a site where a by-pass is needed so that capacitance effect induced by the two exposed copper zones constitutes an equivalent by-pass capacitor that can replace a by-pass used in the known techniques, whereby the number of by-pass capacitors used in a driving circuit of liquid crystal display can be reduced to reduce cost and complication of the circuit.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for saving by-pass capacitor by using circuit board, comprising the following steps:
   (1) providing a liquid crystal panel, wherein the liquid crystal panel comprises two glass substrates and a liquid crystal material arranged between the two glass substrates, the glass substrates forming a liquid crystal panel driving circuit, the liquid crystal panel driving circuit comprising a gate driver comprising a plurality of gate driving chips, a source driver comprising a plurality of source driving chips, a plurality of gate lines respectively corresponding to the plurality of gate driving chips, and a plurality of data lines respectively corresponding to the plurality of source driving chips, the plurality of gate lines and the data lines defining a plurality of pixel units, the liquid crystal material comprising liquid crystal molecules;
   (2) providing a power supply module and a power connection circuit board that are separate from the liquid crystal panel, wherein the power connection circuit board comprises two printing plates that are arranged parallel to and opposite to each other and a base material comprising an insulation material arranged and interposed between the two printing plates, one of the printing plates being provided with a power route that is directly connected to the power supply module, the other one of the printing plates being provided with a grounding route, the power route and the grounding route each comprising an exposed copper zone at a location corresponding to an input terminal of each of the gate driving chips and source driving chips, the two exposed copper zones that are opposite to and spaced from each other and the base material interposed between the two exposed copper zone collectively forming an equivalent by-pass capacitor to achieve an effect of by-pass capacitance;
   (3) connecting the gate driver and the source driver of the liquid crystal panel via the power connection circuit board to the power supply module; and
   (4) activating the power supply module to supply electrical power to the gate driver and the source driver so as to control, via the data lines and the gate lines, the rotation of liquid crystal molecules contained in each of the pixel units.

2. The method for saving by-pass capacitor by using circuit board as claimed in claim 1, wherein the pixel units each comprises a thin-film transistor, a common electrode, a pixel electrode electrically connected to the thin-film transistor, and a storage capacitor, the thin-film transistors being respectively and electrically connected via the gate lines and the data lines to the gate driver and the source driver, the common electrode and the pixel electrode collectively forming a liquid crystal capacitor, the storage capacitor being connected in parallel with the liquid crystal capacitor.

3. The method for saving by-pass capacitor by using circuit board as claimed in claim 2, wherein the thin-film transistors each comprises a gate terminal, a source terminal, and a drain terminal, the gate terminal being electrically connected via the respective gate line to the gate driver, the source terminal being electrically connected via the respective data line to the source driver, the drain terminal being electrically connected to the pixel electrode.

4. The method for saving by-pass capacitor by using circuit board as claimed in claim 1, wherein the exposed copper zones of each of the equivalent by-pass capacitors have an effective area that is determined according to capacitance of the desired capacitor at the location.

5. The method for saving by-pass capacitor by using circuit board as claimed in claim 4, wherein each of the equivalent by-pass capacitors has capacitance determined by the following equation:

$$c = \in *S/D$$

in which $\in$ indicates dielectric constant of the base material, D is thickness of the board of the base material, and S indicates effective area of the exposed copper zones.

6. The method for saving by-pass capacitor by using circuit board as claimed in claim 1, wherein the power supply module comprises a DC-DC conversion power supply.

7. A method for saving by-pass capacitor by using circuit board, comprising the following steps:
  (1) providing a liquid crystal panel, wherein the liquid crystal panel comprises two glass substrates and a liquid crystal material arranged between the two glass substrates, the glass substrates forming a liquid crystal panel driving circuit, the liquid crystal panel driving circuit comprising a gate driver comprising a plurality of gate driving chips, a source driver comprising a plurality of source driving chips, a plurality of gate lines respectively corresponding to the plurality of gate driving chips, and a plurality of data lines respectively corresponding to the plurality of the source driving chips, the plurality of gate lines and the data lines defining a plurality of pixel units, the liquid crystal material comprising liquid crystal molecules;
  (2) providing a power supply module and a power connection circuit board that are separate from the liquid crystal panel, wherein the power connection circuit board comprises two printing plates that are arranged parallel to and opposite to each other and a base material comprising an insulation material arranged and interposed between the two printing plates, one of the printing plates being provided with a power route that is directly connected to the power supply module, the other one of the printing plates being provided with a grounding route, the power route and the grounding route each comprising an exposed copper zone at a location corresponding to an input terminal of each of the gate driving chips and source driving chips, the two exposed copper zones that are opposite to and spaced from each other and the base material interposed between the two exposed copper zone collectively forming an equivalent by-pass capacitor to achieve an effect of by-pass capacitance;
  (3) connecting the gate driver and the source driver of the liquid crystal panel via the power connection circuit board to the power supply module; and
  (4) activating the power supply module to supply electrical power to the gate driver and the source driver so as to control, via the data lines and the gate lines, the rotation of liquid crystal molecules contained in each of the pixel units;
  wherein the pixel units each comprises a thin-film transistor, a common electrode, a pixel electrode electrically connected to the thin-film transistor, and a storage capacitor, the thin-film transistors being respectively and electrically connected via the gate lines and the data lines to the gate driver and the source driver, the common electrode and the pixel electrode collectively forming a liquid crystal capacitor, the storage capacitor being connected in parallel with the liquid crystal capacitor;
  wherein the thin-film transistors each comprise a gate terminal, a source terminal, and a drain terminal, the gate terminal being electrically connected via the respective gate line to the gate driver, the source terminal being electrically connected via the respective data line to the source driver, the drain terminal being electrically connected to the pixel electrode;
  wherein the exposed copper zones of each of the equivalent by-pass capacitors have an effective area that is determined according to capacitance of the desired capacitor at the location;
  wherein each of the equivalent by-pass capacitors has capacitance determined by the following equation:

$$c = \in *S/D$$

in which $\in$ indicates dielectric constant of the base material, D is thickness of the board of the base material, and S indicates effective area of the exposed copper zones; and
  wherein the power supply module comprises a DC-DC conversion power supply.

* * * * *